United States Patent [19]

Robbins

[11] 4,255,236
[45] Mar. 10, 1981

[54] REACTOR AND FUEL ASSEMBLY DESIGN FOR IMPROVED FUEL UTILIZATION IN LIQUID MODERATED THERMAL REACTORS

[76] Inventor: Thomas R. Robbins, 1528 Crofton Pkwy., Crofton, Md. 21144

[21] Appl. No.: 847,524

[22] Filed: Nov. 1, 1977

[51] Int. Cl.² .................. G21C 7/00; G21C 7/30; G21C 19/20
[52] U.S. Cl. ........................ 176/20 SS; 176/21; 176/30
[58] Field of Search ............ 176/20 R, 20 SS, 21, 176/30, 31, 86 L, 86 R, 94, 32; 214/18 N; 294/86 A

[56] References Cited

U.S. PATENT DOCUMENTS

| | | | |
|---|---|---|---|
| 3,070,531 | 12/1962 | Huet | 176/21 |
| 3,081,246 | 3/1963 | Edlund | 176/20 SS |
| 3,105,036 | 9/1963 | Puechl | 176/20 SS |
| 3,141,827 | 7/1964 | Iskenderian | 176/78 |
| 3,142,624 | 7/1964 | Edlund | 176/20 SS |
| 3,180,799 | 4/1965 | Blake | 176/21 |
| 3,801,443 | 4/1974 | Yasukawa | 176/30 |
| 3,928,128 | 12/1975 | Kollmar | 176/30 |

Primary Examiner—Donald P. Walsh
Attorney, Agent, or Firm—Sughrue, Rothwell, Mion, Zinn and Macpeak

[57] ABSTRACT

An improved reactor and fuel assembly design is disclosed wherein a light water reactor is initially run with undermoderated fuel assemblies to take advantage of increased conversion ratio, and after a suitable period of operation, the neutron spectrum for the undermoderated assemblies is shifted to lower energies to increase reactivity by withdrawing a number of fuel rods from the assemblies. The increased reactivity allows for continued operation of the modified assembly, and the fuel rods which are removed are used to construct similar assemblies which are also capable of continued operation. The improved reactor and fuel assembly design results in improved fuel utilization and neutron economy and reduced control requirements for the reactor.

12 Claims, 7 Drawing Figures

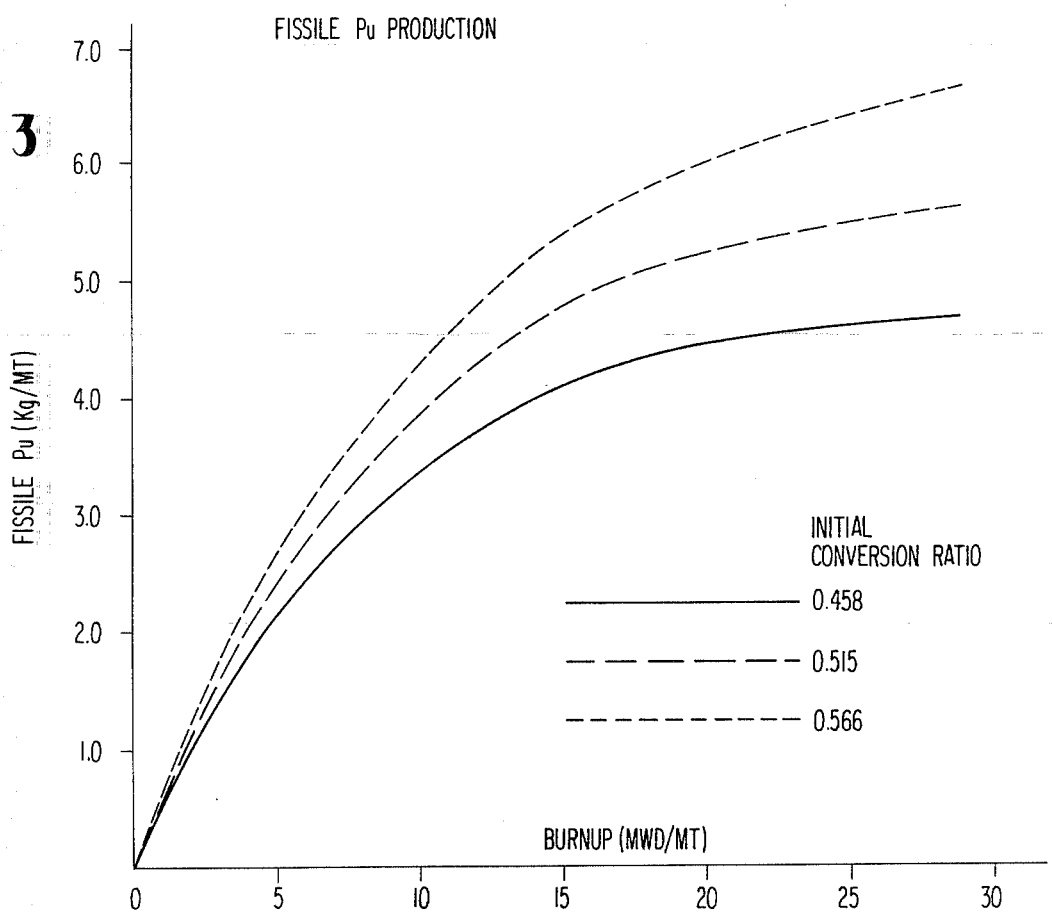
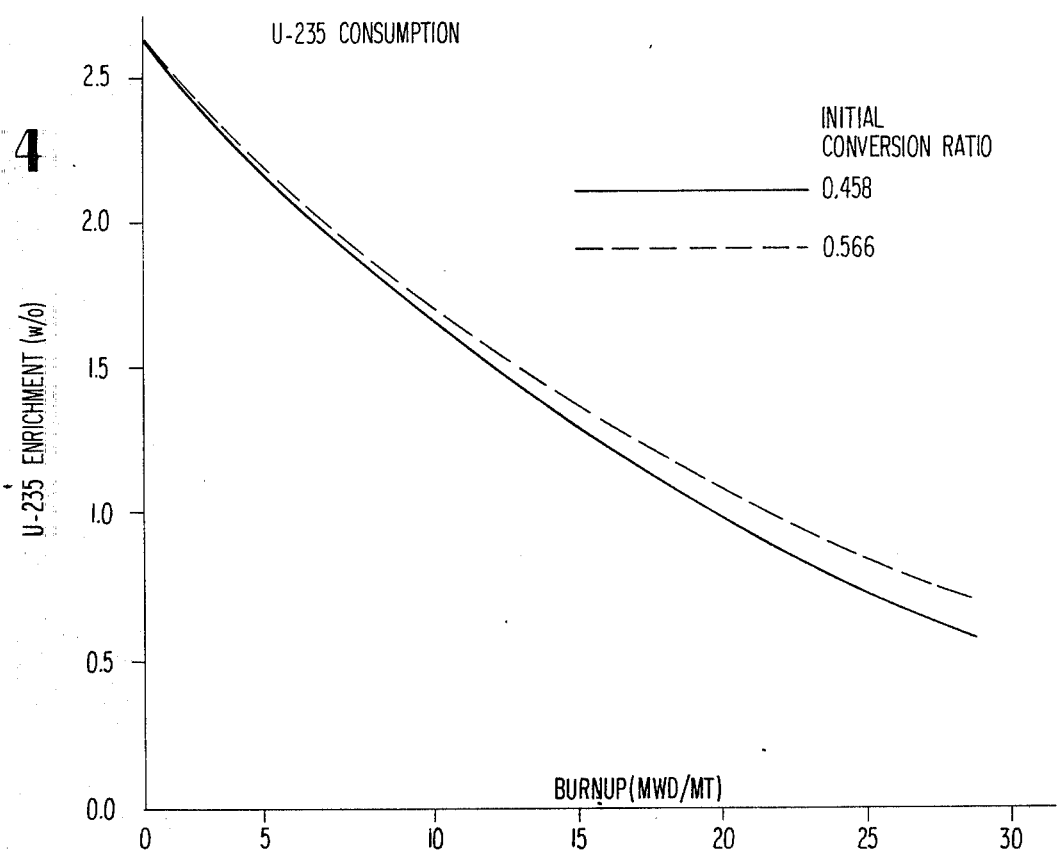

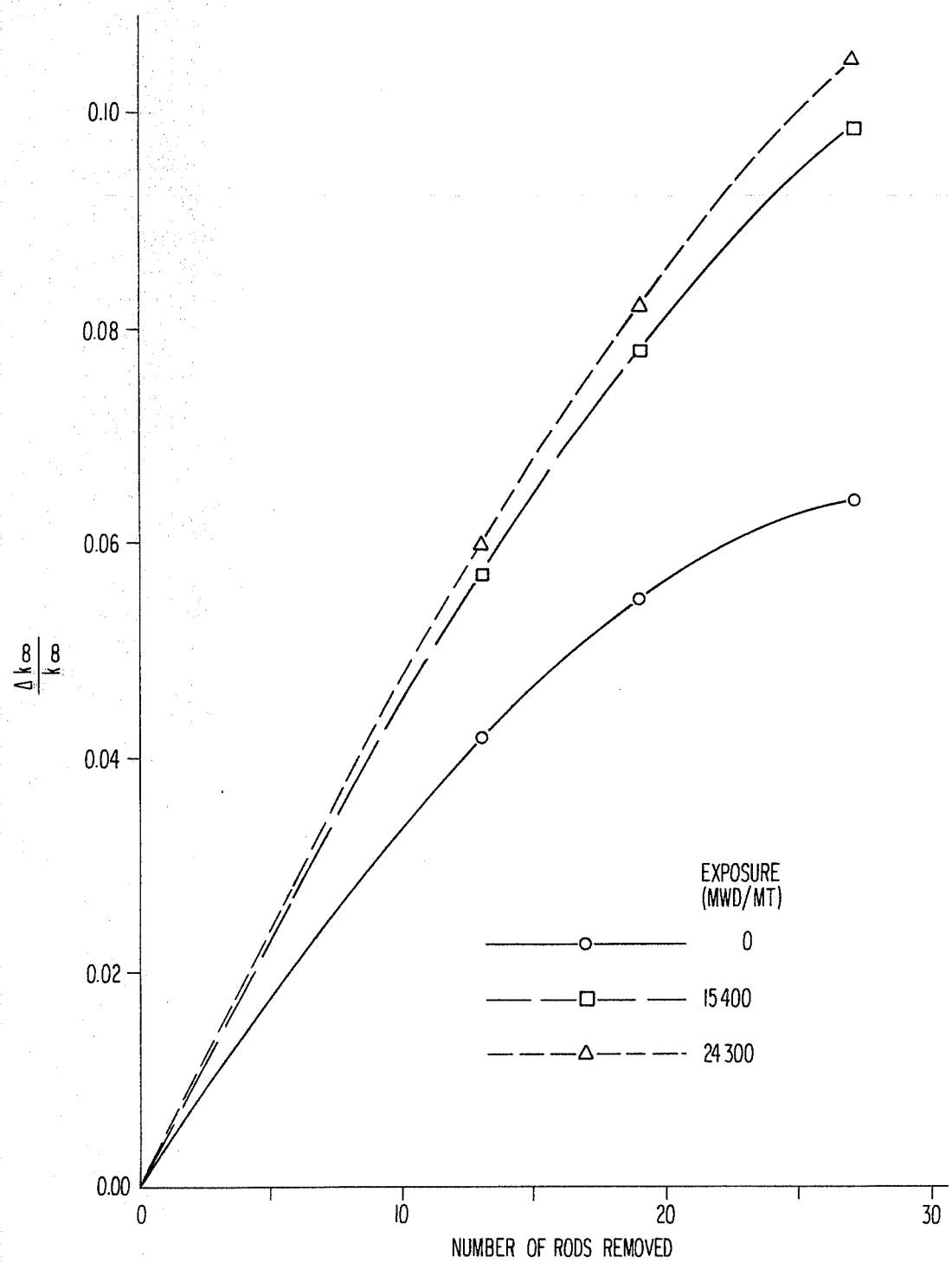

FIG 6
INITIAL FUEL BUNDLE CONFIGURATION
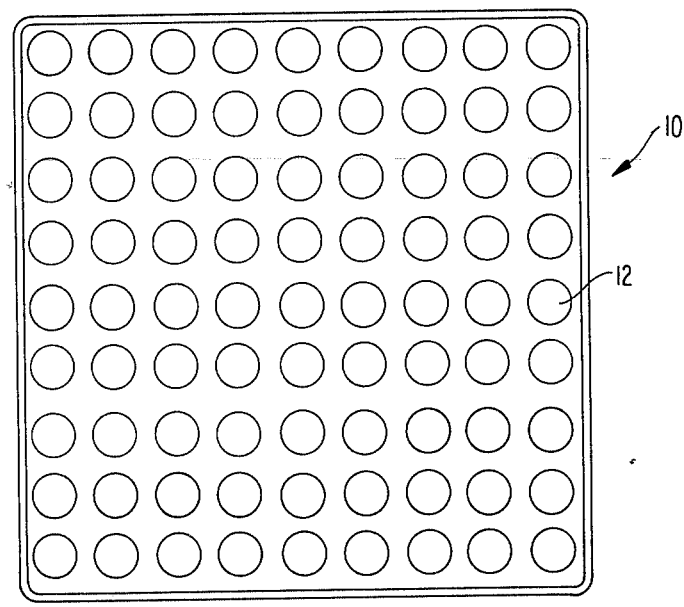
FINAL FUEL BUNDLE CONFIGURATION
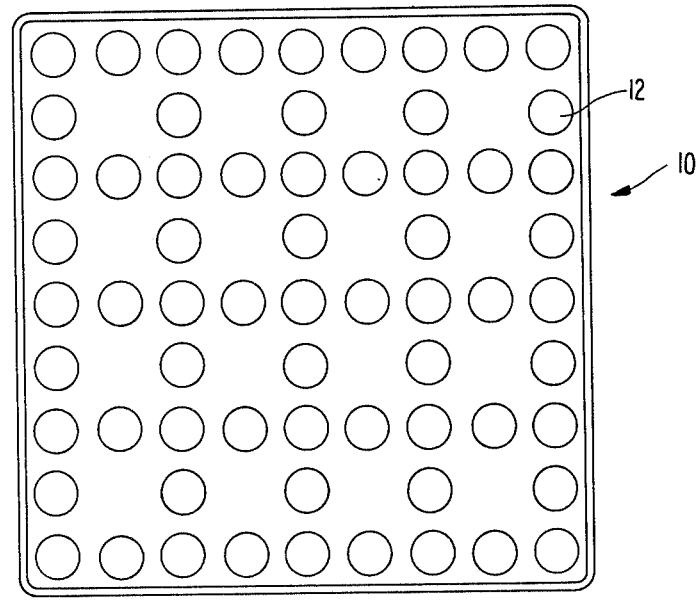
BWR FUEL BUNDLE EXAMPLE

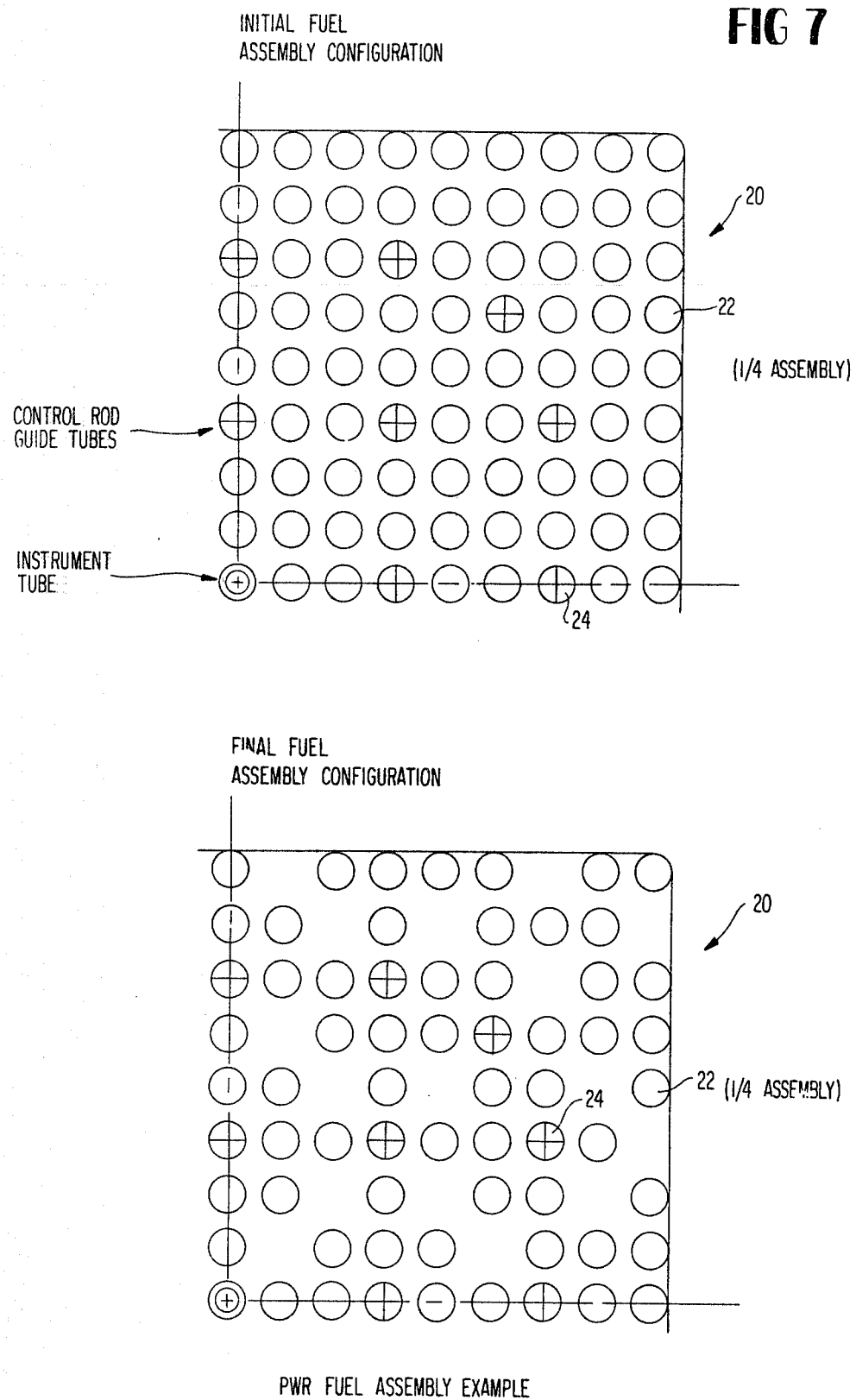

REACTOR AND FUEL ASSEMBLY DESIGN FOR IMPROVED FUEL UTILIZATION IN LIQUID MODERATED THERMAL REACTORS

CROSS REFERENCE TO INVENTION DISCLOSURE

The invention disclosed in this application was also disclosed in Document Disclosure No. 064265 filed in the U.S. Patent and Trademark Office on Sept. 16, 1977.

BACKGROUND OF THE INVENTION

1. Field Of The Invention

The present invention relates to liquid moderated thermal reactors and, more particularly, to a method for operating a light water nuclear reactor resulting in improved fuel utilization and neutron economy and reduced control requirements.

2. The Prior Art

General methods of improving fuel utilization in nuclear reactors have been suggested and evaluated but are not immediately applicable to light water reactors of current design, or are impractical from a technological or economic viewpoint. One of the more promising reactor concepts is the spectral shift controlled reactor (SSCR), described in U.S. Pat. No. 3,081,246, which issued Mar. 12, 1963, to M. C. Edlund. This reactor operates with a mixture of heavy and light water as both coolant and moderator. Improves fuel utilization and a portion of the reactor control requirement are achieved by controlling the relative concentrations of light and heavy water in the coolant, and thereby changing the neutron slowing down power or moderation to change the average neutron energy in the reactor, and when fertile material is present to increase the productive resonance capture of neutrons by the fertile material. At the start of a fuel cycle, there is a high concentration of $D_2O$ in the core and the neutron spectrum is shifted toward higher energies, which reduces reactor excess reactivity and increases the reactor conversion ratio. As operation proceeds, $H_2O$ is added and the spectrum is shifted to lower energies, which increases reactivity and tends to reduce the conversion ratio. Unlike the present invention, the SSCR is based on continuous shifts in the neutron spectrum (characterized by the H/fuel ratio) throughout the lifetime of the fuel in the reactor. The present invention does not rely upon $D_2O$ to shift the neutron spectrum and does not require large changes in H/fuel ratio during each cycle of operation. As will be discussed in detail below, the neutron spectrum is shifted from an exceptionally low value used for initial operation to an exceptionally high value by withdrawing fuel rods from the reactor core and thereby reducing the relative amount of fuel in the core.

There are a number of disadvantages associated with the SSCR, most of which derive from the use of $D_2O$, which are avoided in the present invention. The $D_2O$ and the equipment required to handle it are expensive and a new supply of $D_2O$ is needed for each fuel cycle. The use of $D_2O$ results in the production of large quantities of tritium which are difficult to control and represent a potential radiological hazard. Since the coolant is changed from high concentration $D_2O$ to $H_2O$ each fuel cycle, the higher conversion ratio characteristic of large $D_2O$ concentrations is only achieved during a portion of the fuel cycle (i.e., the average coolant $D_2O$ concentration during the cycle is about one-half the initial and final values). At the start of operation of each cycle when the coolant is high concentration $D_2O$, the neutron leakage is larger than in a 100% water moderated reactor due to the smaller slowing down power of $D_2O$ as compared to $H_2O$. Neutron leakage from the core is reflected as a direct loss in conversion ratio, thus reducing the improvement in conversion ratio which could otherwise have been obtained by a shift in neutron energy spectrum.

Other patents to M. C. Edlund in this area are: U.S. Pat. No. 3,142,624, wherein the same technique described above is used in conjunction with a seed-blanket breeder reactor; and U.S. Pat. No. 3,247,072 wherein control is achieved by varying the density of a hydrogen-isotope-bearing vapor in the core.

Outside of shifting the neutron spectrum, the art takes various approaches to improving fuel utilization. Many of these approaches involve designing the reactor core with different spatial regions of different reactive systems. In U.S. Pat. No. 3,884,886 to Crowther, for example, plutonium fuel is placed in fuel assemblies at the periphery of the core where there is a low energy neutron spectrum, and enriched fuel assemblies are placed at the center portions of the core where there is a higher energy neutron spectrum. U.S. Pat. No. 3,141,827 to Ishenderian discloses a breeder reactor core with a central core of enriched fuel with alternate zones of depleted and enriched fuel. This arrangement causes a peak thermal flux to occur in the depleted elements which results in increased conversion of U-238 to PU-239. U.S. Pat. No. 3,093,563 to Menke teaches a reactor core constructed with an inner active core in the fast neutron range and an outer active core in the slow range. U.S. Pat. No. 3,351,532 to Raab, Jr., et al. teaches a seed-blanket reactor wherein the H/fuel ratio in the seed is set so the number of fissions in the seed is a maximum and the H/fuel ratio in the blanket is set so the number of conversions in the blanket is maximized. Unlike any of the latter group of reactors, the present invention does not rely upon a reactor core which is constructed with different spatial regions of different reactivity. Again, none of these inventions teaches the art of setting the H/fuel ratio at a low value for an initial period of operation and later increasing the H/fuel ratio by withdrawing rods and thereby reducing the relative amount of fuel in the core.

In addition to the foregoing, the prior art recognizes that the reactivity of a fuel assembly can be increased by withdrawing fuel rods, and this operation has been considered at the time the fuel assembly is normally scheduled for discharge in order to boost its reactivity and allow for some additional period of operation and thereby obtain some improvement in fuel utilization. This prior art does not allow for assembly operation in an undermoderated condition and, consequently, does not acquire the benefits of increased fissile material production and reduced control requirements accorded the present invention, both of which result in a much larger improvement in fuel utilization than can be obtained operating in a near optimum moderated condition throughout the life of the fuel assembly and withdrawing fuel rods at the time normally scheduled for discharge.

SUMMARY OF THE INVENTION

It is the primary object of the present invention to improve fuel utilization in a light water nuclear reactor by increasing the energy production obtainable from a given quantity of nuclear fuel and by reducing parasitic absorption of neutrons in non-fertile materials.

An important object of the present invention is to improve fuel utilization and neutron economy by a technique which can be utilized in existing nuclear reactors and those under construction without substantial modifications of the reactor internals or control systems.

A further object of the present invention is to improve fuel utilization and neutron economy by shifting the neutron spectrum one or more times part way through the operation of the reactor without the disadvantages associated with the use of deutrium in the SSCR.

A related object of the present invention is to shift the neutron spectrum without relying upon $D_2O$.

These and other objects of the present invention are attained by increasing the H/fuel ratio after a suitable period of operation by decreasing the relative amount of fuel (removing a number of fuel rods) in the reactor core. For a better understanding of the invention, its operating advantages and specific objects attained by its use, reference should be made to the accompanying drawings and descriptive matter in which there is illustrated and described a preferred embodiment of the invention.

BRIEF DESCRIPTION OF THE DRAWINGS

FIG. 3 is a plot of plutonium production versus burn-up at three different conversion ratios.

FIG. 4 is a plot of U-235 consumption versus burn-up for two different conversion ratios.

FIG. 5 is a plot of the change in reactivity versus number of fuel rods removed from a bundle at three exposures.

FIG. 6 is an overhead perspective view of a boiling water reactor fuel bundle before and after fuel rod removal.

FIG. 7 is an overhead perspective view of a fuel assembly for a pressurized water reactor before and after fuel rod removal.

DESCRIPTION OF THE INVENTION

Figure 1:
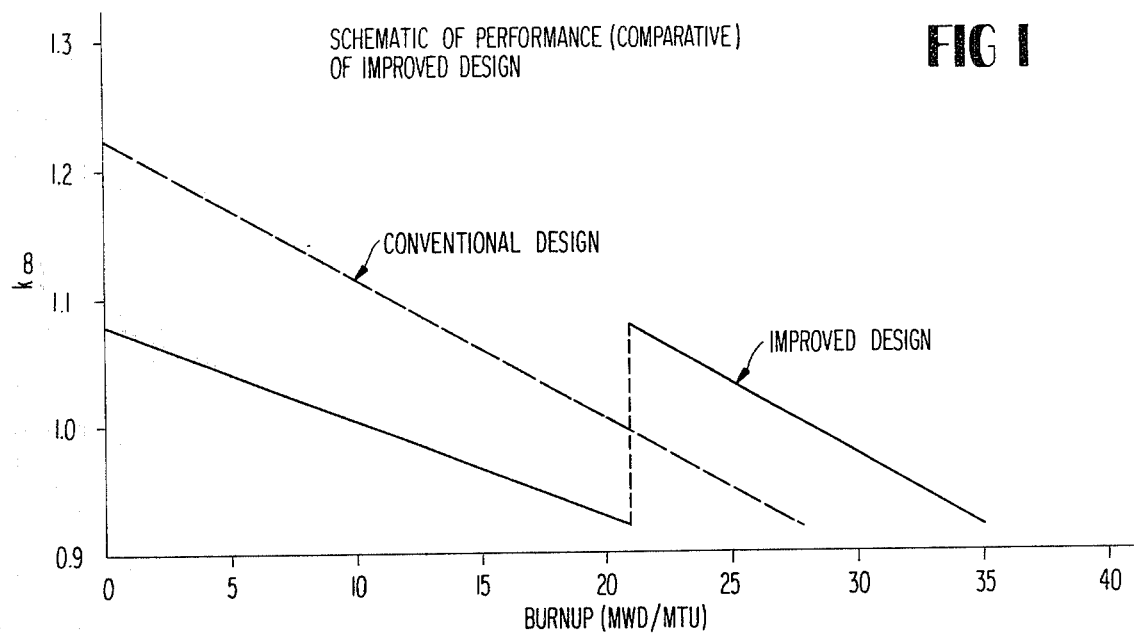
FIG. 1 is a plot of reactivity versus burn-up for a conventional operation and the present invention.

In accordance with the invention, an improved fuel assembly design is provided for utilization in liquid moderated thermal reactors (e.g., both pressurized water reactors and boiling water reactors). The new fuel assembly design results in improved utilization of natural resources by increasing the energy production obtainable from a given quantity of nuclear fuel and by reducing parasitic absorption of neutrons in non-fertile materials, which would otherwise be required to achieve the increased energy production in the current conventional assembly designs for liquid moderated thermal nuclear reactors. Among the important unique features of the invention are that the improved fuel utilization and neutron economy are achieved through the embodiment of existing and proven technology. The invention may be utilized in existing nuclear reactors and those under construction without any modifications of the reactor internals or control systems. The new fuel assembly design may be readily incorporated within the physical envelope of any of the many existing and planned fuel assembly designs of the several manufacturers of light water reactors. While the discussion which follows makes specific reference to light water reactors, it will be apparent to the skilled artisan that the principals involved are applicable to liquid moderated thermal nuclear reactors in general.

Throughout the specification and claims which make up this application, the term "optimum moderated condition" and the like refers to moderating or slowing down the neutrons in the fuel assembly such that the probability of the neutrons producing a fission and more neutrons is maximized—i.e., the H/fuel atomic ratio is such that the lattice neutron multiplication factor is maximized. Likewise, an "undermoderated condition" is a condition in the fuel assembly where the neutrons are not slowed to the point at which fission is maximized—i.e., the H/fuel atomic ratio is less than that which maximizes the lattice neutron multiplication factor.

In the new fuel assembly design, the fuel rods are arranged on a square or triangular pitch in a rather closely packed array so that the lattice of uranium and water results in an undermoderated condition. This undermoderated condition reduces the inherent excess reactivity of the lattice, thereby minimizing the number of excess neutrons which must be parasitically absorbed by any of the moveable control elements (e.g., control rods), fixed control elements (e.g., burnable poisons) and variable control systems (e.g., boric acid dissolved in the moderator). Instead, the excess neutrons are absorbed in the fertile fuel material (e.g., U-238 or TH-232), which results in the production of additional fissile materials during irradiation. The undermoderated lattice thereby achieves a larger conversion ratio (i.e., the ratio of captures in fertile materials to absorptions in fissile materials) during the first period of operation in the reactor compared to that of a current conventional fuel assembly.

After a suitable period of operation, for instance, after the fuel assembly has been burned in the reactor for one or more fuel cycles so that the concentration of bred fissile materials (i.e., Pu-239, Pu-241 and/or U-233) approaches equilibrium concentration or, for instance, the excess reactivity of the fuel assembly becomes too small to support additional reactor operation; a number of fuel rods are removed from the fuel assembly in a regular pattern so that a new lattice of fuel rods is obtained which is nearer the optimum moderated condition (i.e., the H/U+Pu ratio) for the concentrations of fissile and fertile fuel materials which exist in the fuel rods at that time. At the time of removal, the original lattice is even more undermoderated than before irradiation began because the bred fissile materials (i.e., Pu-239, Pu-241 or U-233) have larger absorption probabilities than the materials which existed in the fuel rods before irradiation. Consequently, the optimum H/fuel ratio will be larger than that which would have been applicable to the initial fuel rods had they been originally irradiated at an optimum moderated condition. As a result of removing the fuel rods and changing the H/fuel ratio (in this case, the H/U+Pu ratio) and its effect on the neutron energy spectrum, a large increase in the assembly excess reactivity is obtained. The lower neutron energy spectrum resulting from the increased moderation results in preferential burn-up of the fissile material which was bred during the previous undermoderated irradiation. This large increase in fuel assembly reactivity makes a positive contribution to the entire core excess reactivity.

The present invention is based on the well-known principal for thermal reactors that the slower the neutron (i.e., the greater the H/fuel ratio), the greater the probability there is to reduce a fission, and the knowledge that fertile materials such as U-238 and thorium have significant resonance capture cross-sections at slightly higher neutron energies (i.e., lower H/fuel ratios). In conventional light water reactor operation, the reactor is run with a fixed lattice spacing of fuel rods from the commencement of operation until the fuel rods are discharged from the reactor. The H/fuel ratio is set so that the maximum controllable reactivity for the fresh fuel is obtained. At this H/fuel ratio, advantage is not taken of the significant resonance capture cross-sections of the fertile materials at the slightly higher neutron energies. Furthermore, in every nuclear reactor there must be arranged a quantity of fissionable material as a fuel and other materials such that there is a sufficient mass to produce a chain reaction. The mass of fissionable material is termed "a critical mass." In order to operate a reactor for an appreciable period of time, there must be included in the reactor an excess of fuel above the critical mass which represents the fuel which may be consumed during operation of the reactor. Consequently, by setting the H/fuel ratio to maximize the reactivity for the fresh fuel in accordance with the conventional approach, far more neutrons than necessary to sustain the chain reaction are produced, and these neutrons (excess reactivity) must be controlled. Neutron control systems either vary the number of neutrons which escape from the periphery of the reactor or non-productively absorb neutrons within the reactor or vary the amount of fuel in use. Consequently, conventional operation is neither fuel efficient nor neutron economic.

The present invention provides for operating the reactor with a large fraction of undermoderated assemblies (e.g., 50% of the core), which reduces the inherent excess reactivity, thereby minimizing the excess neutrons which must be parasitically absorbed and taking advantage of the higher resonance capture cross-sections of the fertile materials in the slightly higher neutron energy spectrum; and after a suitable period of operation, shifting the neutron energy spectrum to slightly lower levels by withdrawing fuel rods from the undermoderated assemblies which raises the reactivity to a level higher in comparison to the reactivity level in conventional operation after a similar irradiation.

The present invention will become even more clear by understanding the accompanying drawings. FIG. 1 is a comparison of fuel assembly performance in accordance with the present invention with conventional operation. FIG. 1 plots excess reactivity versus burn-up. The curve for the conventional reactor is characterized by high initial excess reactivity. The H/fuel ratio and neutron energy spectrum for the fuel assembly are fixed at the start of irradiation by the number and design of the fuel rods and the amount of coolant or moderator; consequently, the fuel assembly reactivity (or neutron multiplication factor) is constantly on the decline. The fuel assembly runs until its rate of neutron production is too low to support additional reactor operation. The present invention, however, is characterized by a much lower initial reactivity consistent with a reactor operating in an undermoderated condition at a relatively lower H/fuel ratio. In accordance with the present invention, the assembly operates for an optimum period of time in this undermoderated condition during which time reactivity is on the decline, but at a slower rate of decline than the conventional operation. This is shown by the smaller slope of the first portion of the curve for the improved design. During this period of operation, the conversion ratio is higher than for the conventional design. Larger amounts of fertile materials are being converted to fissile materials in the assembly because the H/fuel ratio favors the resonance capture of neutrons by the fertile materials. During this period of operation, neutrons are being economically absorbed in the fertile material rather than parasitically absorbed by the neutron control system as they would be during the analogous period of operation in the conventional design.

Figure 2:
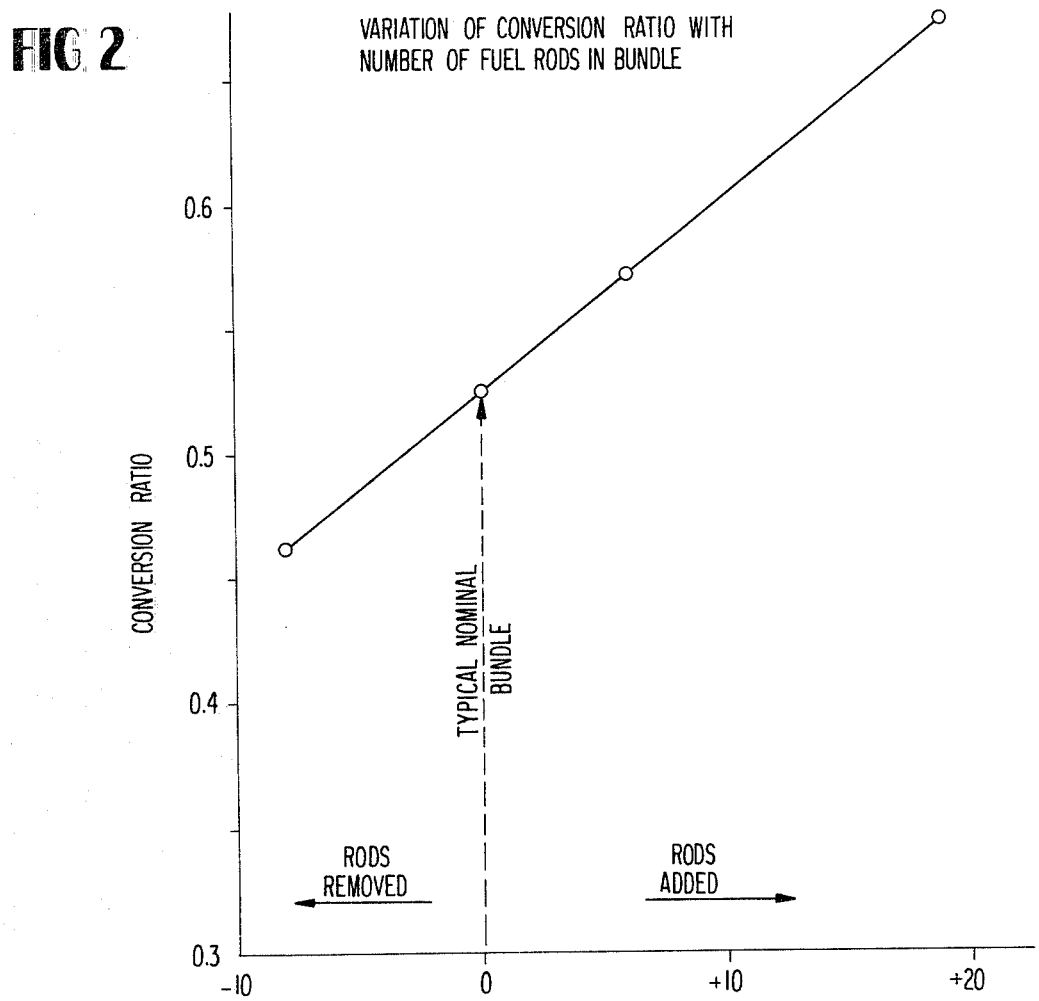
FIG. 2 is a plot of conversion ratio versus number of fuel rods for a boiling water reactor.

FIG. 2 shows the variation of initial conversion ratio for a typical boiling water reactor fuel bundle as additional fuel rods are added or some fuel rods are removed. The nominal bundle indicated is representative of current designs, and is, therefore, near an optimum H/fuel ratio for a fixed lattice geometry. In the invention described, fuel rods may be added or the fuel rod diameter increased to increase the conversion ratio and thereby increase fissile Pu production. Although the bundle excess reactivity is also reduced as fuel rods are added or the fuel rod diameter is increased, this apparent reactivity loss is regained when fuel rods are removed after one or more cycles of bundle irradiation, as demonstrated in FIG. 1. In fact, more excess reactivity is gained by removing fuel rods after irradiation than could be gained initially by removing rods because of the increased fissile Pu production and the reduced U-235 consumption which resulted from the improved conversion ratio, as will be shown below. If a corresponding reduction in H/fuel ratio were made in the conventional design, the reactivity loss accompanying the improved conversion ratio cannot be completely recovered, and, therefore, it is not possible to take advantage of the higher conversion ratios in the conventional design. Accordingly, in conventional designs currently employed in light water reactors, a compromise must be made between the desire to achieve a high conversion ratio and the need to achieve sufficient excess reactivity to allow operation of the reactor for reasonable periods of time between refuelings and to achieve economical total fuel irradiation times. This invention eliminates the need for such a compromise and thereby allows improved fuel utilization.

FIG. 3 is an example of the increased fissile Pu production which can be achieved by an increase in conversion ratio. FIG. 4 shows that at these increased conversion ratios, U-235 burn-up is also reduced, and confirms the slower rate of reactivity decline observed in FIG. 1. FIGS. 3 and 4 together show that the period of irradiation spent breeding fissile material is not completely offset by U-235 burn-up. On the contrary, during fissile material production, U-235 is not used up at the same rate as in conventional operation, and consequently, by shifting the neutron energy spectrum, the loss of U-235 can be more than recovered in the gain in bred fissile material.

As pointed out above, in conventional design, the initial H/fuel ratio can be set to improve conversion at the expense of reactivity; however, in the conventional design, the reactivity loss accompanying improved conversion can never be completely recovered. The reactivity would quickly diminish to low levels at which additional reactor operation would not be supported. For example, in FIG. 1 the first portion of the curve for the improved design of the present invention reaches the reactivity level at which operation in the conventional design is stopped at a much earlier point in time (i.e., after much less fuel burn-up). Consequently, it is not possible to take advantage of the higher conversion ratios with conventional operation.

In accordance with the present invention, after a suitable period of operation, fuel rods are removed from the fuel assembly in a regular pattern to shift the H/fuel ratio upward nearer the optimum moderated condition for the concentrations of fissile and fertile materials at the time of fuel rod removal. The optimum H/fuel ratio is larger at this time than the optimum value before irradiation begins, and the present invention takes advantage of this shift in optimum H/fuel ratio; whereas the convention design does not. This shift is shown by the step (dotted line) in the improved design curve in FIG. 1. This shift is accompanied by increased reactivity such that the excess reactivity level for the improved design is significantly higher than for the conventional design after an equivalent period of irradiation. This is shown in the figure by the higher reactivity level for the improved design than for the conventional design after an equal amount of burn-up. This means that the improved design can operate to a higher burn-up than the conventional design, and thereby achieve better fuel utilization. This is because improved conversion of fertile material is achieved, and a near optimum moderate condition is achieved after substantial conversion of fertile material. Therefore, the reactivity of the bred fissile material can support additional assembly operation. FIG. 5 illustrates the increase in excess reactivity ($\Delta K\infty/K\infty$) that can be achieved by removing rods after the buildup of significant quantities of fissile Pu.

Summarizing, compared to a fuel assembly irradiation in the conventional manner, the ability to change the neutron spectrum part way through the irradiation allows the production of larger quantities of fissile material through captures in fertile material while the lattice is substantially undermoderated and then allows the fissioning of larger quantities of bred fissile materials in a lattice that is near the optimum moderating ratio for the material content of the irradiated fuel. This results in improved fuel utilization compared to that which can be obtained by irradiation of a conventional fuel assembly in the conventional manner. The new fuel assembly also reduces the total excess reactivity which must be controlled in the unirradiated fuel assembly by virtue of the large reactivity increase obtained part way through the cycle. In addition to allowing for larger fuel burn-ups in a given reactor system, this reduced control requirement may be used to increase fuel cycle flexibility by allowing the reactor to run longer between successive refuelings. In the conventional fuel assemblies, all the excess reactivity required for the total irradiation must be built in at the start and then controlled by parasitic neutron absorbers. This invention reduces parasitic absorption, which improves neutron economy and thus further contributes to improved fuel utilization by absorbing part of these excess neutrons in fertile fuel material.

It should be apparent from the foregoing discussion that the point in time at which the fuel rods are removed from the fuel assembly is a matter susceptible to optimization of which one of ordinary skill in the art is clearly capable without undue experimentation. Generally, a suitable period of operation will be anywhere from $\frac{1}{4}$ to $\frac{3}{4}$ the normal operating lifetime of the fuel, depending on the reactor and assembly design. The optimum point in time for the removal will be a balance between increased conversion on the one hand and the reactivity level on the other. Clearly, when the concentrations of bred fissile materials approach equilibrium, there is no reason to continue operation in the undermoderated condition since the maximum amount of bred fissile material one can expect to obtain has been achieved. On the other hand, if the reactivity begins to approach a level at which the fuel assembly no longer supports additional operation, the fuel rods will then be removed to obtain the accompanying step-up in reactivity. Reactor and fuel assembly design may also dictate withdrawing fuel rods on more than one ocassion during the lifetime of the fuel assembly. It should be apparent to the skilled artisan that given a fuel assembly with a suitable number of fuel rods and suitable amount of fuel, FIG. 1 could be extrapolated with additional stepwise increases in reactivity any time the reactivity drops to an undesirably low level or the equilibrium concentration is reached until the amount of fuel left in the assembly is insufficient to make the additional change in H/fuel ratio economically worthwhile. Again, the frequency of fuel rod removal is also a subject of optimization clearly within the ability of one skilled in the art given the teaching in this disclosure.

It should also be apparent from the above discussion that the teachings of the present invention apply to fertile materials in general, U-238 and Th-232 being those conventionally employed.

Fuel rod removal can be accomplished using a variety of techniques. The fuel assembly may be removed from the reactor and placed in a spent fuel pool, the top fixtures of the assembly then removed by remote handling tools underneath the water in the pool, and a number of the fuel rods are removed in a regular pattern so that a new lattice of fuel rods is obtained which is near the optimum moderated condition. Optionally, hollow tubes containing no fissile materials may be inserted to replace the fuel rods that have been removed. Such replacement rods may be desired to maintain fuel assembly structural integrity, to control fuel assembly pressure drop and coolant flow, and to prevent boiling in the water inside the hollow tubes in the case of a boiling water reactor bundle. Once the fuel assembly top fixtures are replaced, the fuel assembly may then be returned to the reactor for one or more additional fuel cycles of irradiation. The fuel rods which were removed may be used to construct additional fuel assemblies equally suitable for reuse in the reactor using fuel assembly skeletons manufactured for that purpose. Thus, there need not be an economic penalty associated with removal of a portion of the fuel rods from the reactor.

Alternatively, the desired number of fuel rods may be removed from the fuel assembly without removal of the assembly from the reactor core. This could be done by removing the top tie plate while the fuel assembly remains in place in the reactor or by means of a specially designed top tie plate which allows removal of fuel rods from selected locations without removal of the top tie plate. In either case, subsequent operations would proceed generally as previously described for the case where the fuel assembly is removed to the spent fuel pool, and hollow tubes may be inserted in empty lattice positions as previously described.

Alternatively, the top and bottom tie plates may be designed with two different sets of rod locations to accommodate a reduced number of fuel rods in a uniform lattice arrangement after removal of a portion of the rods. The remaining fuel rods might also be rearranged using a moveable spacer grid support system which is capable of fixing the rod-to-rod spacing on two different lattice pitches corresponding to the desired undermoderated and near optimum moderated conditions.

Alternatively, the fuel assembly may be removed from the reactor and all fuel rods removed for reinsertion in fuel assembly skeletons supplied for that purpose with a lattice pitch characteristic of the increased H/U+Pu ratio desired for subsequent irradiation.

It should be apparent from the foregoing that numerous operations and constructions are possible for performing the fuel rod removal taught by this disclosure, and regardless of the means, such fuel rod removal would fall within the present invention.

The pattern in which the fuel rods are removed from the fuel assembly is not critical; however, in order to maintain the power distribution in the fuel assembly uniform, the rods will preferably be removed in a regular pattern. FIG. 6 is an illustration of a typical BWR fuel bundle before and after fuel rod removal. In FIG. 6, the assembly is designated 10 and the fuel rods 12. FIG. 7 is an illustration of ¼ of a PWR fuel assembly, again the fuel rods are removed in a nearly uniform pattern. The assembly is designated 20, the fuel rods 22 and the control rods 24.

ter fuel rods are used to establish a lower initial H/fuel ratio than in the typical conventional design. Subsequently, after a suitable period of operation, 64 rods are removed and the rods are rearranged in the equivalent pitch for a completely uniform lattice in a near optimum moderated condition.

TABLE 1
TYPICAL LARGE BWR FUEL DATA

| Core | |
|---|---|
| Reactor core heat output, MWT | 3,800 |
| Fuel cell spacing (control rod pitch), in. | 12 |
| Number of fuel assemblies | 848 |
| Total number of fuel rods | 53,424 |
| Core power density (rated power), kW/liter | 51.3 |
| Specific power (rated power), kW/kg U | 23.7 |
| Average linear rod power (rated power), kW/ft | 5.54 |
| Core average heat flux, Btu/hr-ft$^2$ | 146,260 |
| Nominal system pressure, psia | 1,050 |
| Fuel Assembly Data | |
| Fuel rod array | 8 × 8 |
| Nominal active fuel length, in. | 148 |
| Fuel rod pitch, in. | 0.640 |
| Space between fuel rods, in. | 0.147 |
| Fuel channel wall thickness, in. | 0.120 |
| Fuel Rod Data | |
| Outside diameter, in. | 0.493 |
| Cladding inside diameter | 0.425 |
| Pellet outside diameter, in. | 0.416 |

TABLE 2
BWR FUEL BUNDLE EXAMPLES

| | Typical Conventional Design | Improved Design - A | | Improved Design - B | |
|---|---|---|---|---|---|
| | | Initial Configuration | Final Configuration | Initial Configuration | Final Configuration |
| Bundle Size (No. Rods) | 8 × 8 | 9 × 9 | 9 × 9[1] | 8 × 8 | 8 × 8[2] |
| Fuel Rod O.D. (Inches) | 0.493 | 0.465 | 0.465 | 0.536 | 0.536 |
| Fuel Rod Pitch (Inches) | 0.636 | 0.565 | 0.631* | 0.636 | 0.720* |
| Lattice Ratio of Water to Non-Water Volume | 1.12 | 0.88 | 1.34 | 0.79 | 1.29 |

[1] 16 fuel rods removed.
[2] 14 fuel rods removed.
*Equivalent pitch for a completely uniform lattice.

In accordance with traditional reactor operating procedures, all of the fuel assemblies in the reactor are not removed at the same time. On the contrary, the fuel assemblies are changed in rotation, for instance, only ¼ of the assemblies being changed at any one time. Similarly, in accordance with the present invention, fuel rods would be removed from a portion of the assemblies making up the reactor core in accordance with a suitable fuel assembly rotation.

To illustrate the invention, Table 1 below gives details of a typical boiling water reactor fuel and Table 2 shows the modifications in the initial and final bundle configurations of the type shown in FIG. 6 used to practice this invention. In Table 2, the ratio of water to non-water volume is taken as the H/fuel ratio in accordance with art recognized practice. The initial H/fuel ratio in bundle A is reduced by increasing the number of fuel rods in the assembly. Subsequently, 16 rods are removed in a regular pattern to increase the H/fuel ratio in the final configuration. In B, the initial ratio is reduced by increasing the diameter of the fuel rods. Subsequently, the H/fuel ratio can be reduced by removing 14 rods in a regular pattern.

Table 3 gives fuel data for a pressurized water reactor. The initial and final configurations of a fuel assembly of the type shown in FIG. 7 are shown in Table 4. In accordance with the improved design, larger diame-

TABLE 3
TYPICAL LARGE PWR FUEL DATA

| Core | |
|---|---|
| Reactor core heat output, MWT | 3,411 |
| Fuel cell spacing, in. | 8.4 |
| Number of fuel assemblies | 193 |
| Total number of fuel rods | 50,952 |
| Core power density (rated power), kW/liter | 105 |
| Specific power (rated power), kW/kg U | 38.2 |
| Average linear rod power (rated power), kW/ft | 5.44 |
| Core average heat flux, Btu/hr-ft$^2$ | 189,800 |
| Nominal system pressure, psia | 2,250 |
| Fuel Assembly Data | |
| Fuel rod array | 17 × 17 |
| Nominal active fuel length, in. | 144 |
| Fuel rod pitch, in. | 0.496 |
| Space between fuel rods, in. | 0.122 |
| Fuel Rod Data | |
| Outside diameter, in. | 0.374 |
| Cladding inside diameter | 0.329 |
| Pellet outside diameter, in. | 0.323 |

TABLE 4
PWR FUEL ASSEMBLY EXAMPLE

|  | Typical Conventional Design | Improved Design Initial Configuration | Improved Design Final Configuration |
|---|---|---|---|
| Bundle Size (No. Rods) | 17 × 17 | 17 × 17 | 17 × 17[3] |
| Fuel Rod O.D. (Inches) | 0.374 | 0.422 | 0.422 |
| Fuel Rod Pitch (Inches) | 0.496 | 0.496 | 0.596* |
| No. of Control Rod or Instrument Spaces | 25 | 25 | 25 |
| Lattice Ratio of Water to Non-Water Volume | 1.45 | 0.93 | 1.54 |

[3] 64 fuel rods removed.
*Equivalent pitch for a completely uniform lattice.

While the invention has been described above in detail and with reference to specific embodiments, it will be apparent to one of ordinary skill in the art that numerous changes and variations are possible without departing from the spirit and scope of the invention covered by the following claims.

What is claimed is:

1. A method of operating a liquid moderated thermal reactor which does not rely upon $D_2O$ to shift the neutron spectrum which comprises:
   (a) initially irradiating at least a portion of the fuel assemblies in the core of the reactor in an undermoderated condition, said fuel assemblies being uranium fuel assemblies enriched with fissile uranium material and comprising a plurality of fuel rods, and said undermoderated condition resulting in increased production of fissile plutonium with reduced uranium burn-up which increases the degree of undermoderation during said irradiation, and
   (b) after irradiation for from $\frac{1}{4}$ to $\frac{3}{4}$ of the normal operating lifetime of the fuel assemblies, withdrawing a fraction of the fuel rods from said undermoderated fuel assemblies such that the hydrogen-to-fuel ratio for said assemblies is nearer the optimum moderated condition for the fuel composition at the time of fuel rod removal and the neutron spectrum is shifted to a lower level.

2. The method of claim 1 wherein said reactor is a light water reactor.

3. The method of claim 2 wherein fuel rods are removed from the fuel assembly to change the hydrogen-to-fuel ratio on more than one ocassion during the lifetime of the fuel in the fuel assembly.

4. The method of claim 2 wherein during the irradiation of said fuel assemblies in an undermoderated condition the conversion ratio is higher and the excess reactivity is lower than during irradiation of said fuel assemblies in a nearer optimum moderated condition.

5. The method of claim 2 wherein the excess reactivity of the reactor is reduced in comparison to the conventional operation described in the specification and the number of parasitically absorbed neutrons is reduced.

6. The method of claim 2 wherein upon starting irradiation the fuel rods are arranged in the fuel assembly in a square or triangular pitch, and after a suitable period of irradiation, a fraction of said fuel rods is removed in a regular pattern such that the power distribution in the assembly is uniform.

7. The method of claim 2 wherein said fuel rods contain fertile U-238 and/or Th-232.

8. The method of claim 2 wherein said reactor is a boiling water reactor.

9. The method of claim 2 wherein said reactor is a pressurized water reactor.

10. The method of claim 2 wherein after withdrawing said fraction of fuel rods, the remaining rods are rearranged on a different lattice pitch.

11. The method of claim 1 wherein during the initial irradiating a relatively low hydrogen-to-fuel ratio exists in said reactor, which relatively low hydrogen-to-fuel ratio is maintained until the concentration of bred fissile plutonium approaches equilibrium, whereafter the fraction of the fuel rods is withdrawn to provide a relatively higher hydrogen-to-fuel ratio.

12. The method of claim 1 wherein the degree of undermoderation is such that generated neutrons are not slowed to the point to maximize fission whereby excess neutrons which are generated are absorbed by fuel present to generate the fissile plutonium and/or fissile uranium and wherein upon when said moderated condition is reached the neutron energy spectrum is shifted to a lower level to maximize the probability of fission.

* * * * *